(No Model.)

T. L. MOORE.
TANDEM BICYCLE.

No. 448,358.  Patented Mar. 17, 1891.

Attest
Paul Laur
Jos. A. Williams

Inventor
Thomas L. Moore
by Carl Spengel Atty.

UNITED STATES PATENT OFFICE.

THOMAS L. MOORE, OF HAMERSVILLE, OHIO.

TANDEM BICYCLE.

SPECIFICATION forming part of Letters Patent No. 448,358, dated March 17, 1891.

Application filed June 16, 1890. Serial No. 355,575. (No model.)

*To all whom it may concern:*

Be it known that I, THOMAS L. MOORE, a citizen of the United States, residing at Hamersville, in the county of Brown and State of Ohio, have invented certain new and useful Improvements in Tandem Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to bicycles, and especially to that class known as "tandems," and arranged to be mounted by two persons.

The special features of this invention are a frame so constructed and arranged that most of the load is placed directly over the hub of the drive-wheel, thereby giving a positive support to the frame and doing away with all heavy and indirect strain on it. This arrangement also allows the use of a shorter frame, which, of course, is equivalent to less weight, and therefore forms quite an important item in a device of this sort. The means connecting the steering-posts serve, also, as braces for the frame, and are so arranged that the front seat of the machine may be made suitable for ladies' use by their detachment. The driving mechanism is so arranged and located that the transmission of the power to the driven parts is accomplished in a short and direct way, obviating all unnecessary friction and loss of force.

The invention is more particularly described in the following specification and claim, and illustrated in the accompanying drawings, in which—

Figure 1:
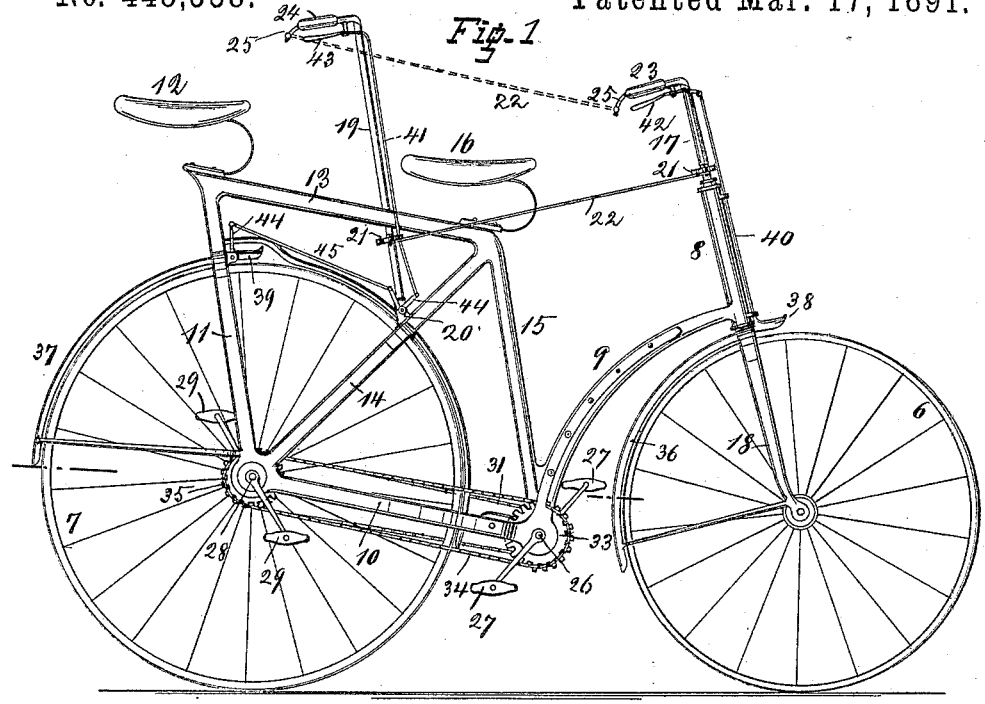
Figure 2:
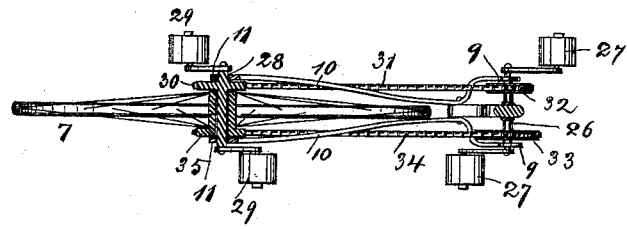
Figure 3:
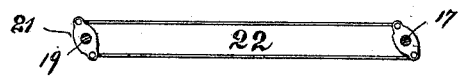

Figure 1 is a side elevation of a tandem bicycle. Fig. 2 is a horizontal section on line 2 2 of Fig. 1, and Fig. 3 is a top view showing connection of the steering-posts to each other.

6 is the front wheel, whereby the machine is guided and steered.

7 is the drive-wheel, to which the power is applied.

8 is a front upright through which the front steering-post 17 passes.

9 and 10 are connections reaching from the steer-wheel back to the drive-wheel and connecting the two.

11 is an upright rising from the hub of the drive-wheel and supporting the rear-seat 12.

13, 14, and 15 form the frame-work sustaining the front seat 16.

Members 8, 9, 10, 11, 13, 14, and 15 are all rigidly and immovably connected to each other.

17 is the front steering-post passing through hollow upright 8 and terminating in a fork 18, the lowest extremities of which form the bearings for the front wheel.

19 is the rear steering-post, resting in a socket 20 on member 14 and held in position by a bearing in member 13. Both posts have levers 21 21 rigidly secured to them and are connected to each other by rods 22 22, by which arrangement either the front or rear rider may assume the steering.

23 are the handles of the front and 24 the ones of the rear steering-post.

In case of a lady mounting the front seat, rods 22 22 are taken off, and one of them may be secured to the corresponding ends of the handles of both posts, which handles have suitable extensions 25 25 provided for this purpose. (See dotted lines in Fig. 1.) As will be seen, the two seats are sustained by a rigid triangular frame formed by members 11, 13, and 14, the whole supported directly by and on the hub of the rear wheel. Members 9, 10, 11, and 14 are duplicated on either side of the machine. At the junction of the members 9 and 10 the bearings for the shaft 26 of the front pedals 27 27 are formed. At the junction of members 10, 11, and 14 the bearings for the shaft 28 of the rear pedals 29 29 are formed. Shaft 28 passes loosely through the hub of the rear wheel and carries on one end a sprocket-wheel 30, connecting by means of a chain 31 to a similar wheel 32 on the front pedal-shaft 26. Another wheel 33 transmits, by means of a second chain 34, the power onto the sprocket-wheel 35, connecting to the hub of the drive-wheel and thus actuating it. In order to gain speed on the sprocket on the hub of the drive-wheel, the diameter of sprocket 33 may be larger than the one of the sprocket first mentioned.

36 and 37 are customary guards covering the upper parts of the wheels.

38 is the front and 39 the rear brake, operated by means of rods 40 and 41 adjacent to the steering-posts and levers 42 and 43 adjacent to the steering-handles 23 and 24. In case of the rear brake two bell-crank levers 44 44 and an additional rod 45 are necessary to complete the connection. These brakes and their connections are the same in their general features as the ones now in use, and therefore are not considered to form a part of this invention.

When rods 22 22 are attached to levers 21 21, they form braces connecting the front and rear part of the machine.

Having described my invention, I claim as new—

In a convertible or drop-frame tandem bicycle, the combination, with the wheels and driving mechanism, of the frame consisting of the members 9, 10, 11, 13, 14, and 15, arranged as shown, and the steering mechanism comprising the front steering-post 17, the rear steering-post 19, resting in a socket on member 14 and held in position by a bearing in member 13 of the frame, a lever secured to each of said steering-posts, a handle also secured to each of said steering-posts, and connecting-rods detachably secured to said levers or to said handles, all substantially as shown and described.

In testimony whereof I affix my signature in presence of two witnesses.

THOMAS L. MOORE.

Witnesses:
H. B. WHITEMAN,
ED TATMAN.